United States Patent
Poll et al.

(10) Patent No.: US 11,814,032 B2
(45) Date of Patent: Nov. 14, 2023

(54) ELECTRIFIED VEHICLE CONTROL WITH DYNAMIC SEGMENT-BASED DISTANCE-TO-EMPTY (DTE)

(71) Applicant: Ford Global Technologies, LLC, Dearborn, MI (US)

(72) Inventors: Mark Poll, Plymouth, MI (US); Erik Biberstein, Novi, MI (US); Ryan Hunt, Royal Oak, MI (US); Jacob Doan, Novi, MI (US); John William Schmotzer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/115,612

(22) Filed: Dec. 8, 2020

(65) Prior Publication Data

US 2022/0176939 A1    Jun. 9, 2022

(51) Int. Cl.
*B60W 20/12*     (2016.01)
*B60L 58/12*     (2019.01)
(Continued)

(52) U.S. Cl.
CPC ............ *B60W 20/12* (2016.01); *B60L 58/12* (2019.02); *B60W 10/26* (2013.01); *B60W 10/30* (2013.01); *B60W 2556/50* (2020.02)

(58) Field of Classification Search
CPC ...... B60W 20/12; B60W 10/26; B60W 10/30; B60W 2556/50; Y02T 10/70; B60L 2260/52
See application file for complete search history.

(56) References Cited

U.S. PATENT DOCUMENTS 5,913,917 A   6/1999  Murphy
8,996,213 B2  3/2015  Ishikawa et al.
(Continued)

OTHER PUBLICATIONS

Interview: Why Ford says Mustang Mach-E has the most accurate EV Range Estimator, Bradley Berman; Jun. 2020; 6 Pages.
(Continued)

*Primary Examiner* — Tyler J Lee
*Assistant Examiner* — Yufeng Zhang
(74) *Attorney, Agent, or Firm* — BROOKS KUSHMAN PC; David Kelley

(57) ABSTRACT

An electrified vehicle having an electric machine coupled to a traction battery to selectively propel the vehicle and associated method for the electrified vehicle include receiving trip data from an external server, the trip data including a plurality of road segments of a selected route from a starting location to a destination, each road segment having an associated energy consumption and distance, calculating a distance-to-empty (DTE) based on a remaining trip distance to the destination, available energy of the traction battery, an estimated traction battery energy required for the remaining trip distance, and an overall vehicle efficiency, the estimated traction battery energy being based on a combination of the received segment energy consumption and distance of each remaining segment in the trip, and communicating the DTE to a display within the electrified vehicle to reduce fluctuations in displayed DTE during travel along routes with nonlinear energy consumption (changing energy efficiency).

15 Claims, 4 Drawing Sheets

(51) Int. Cl.
  *B60W 10/26* (2006.01)
  *B60W 10/30* (2006.01)

(56) References Cited

U.S. PATENT DOCUMENTS

| | | | |
|---|---|---|---|
| 9,037,327 | B2 | 5/2015 | Kim |
| 9,545,915 | B2 * | 1/2017 | Phillips ............... B60L 15/2045 |
| 10,415,986 | B2 | 9/2019 | Meyer et al. |
| 10,571,287 | B2 | 2/2020 | Moore et al. |
| 10,739,154 | B2 * | 8/2020 | Zhou .................. G01C 21/3469 |
| 2013/0079962 | A1 | 3/2013 | Ishikawa et al. |
| 2013/0311016 | A1 | 11/2013 | Kim |
| 2015/0158397 | A1 | 6/2015 | Soto et al. |
| 2015/0276420 | A1 | 10/2015 | McGee et al. |
| 2017/0038222 | A1 | 2/2017 | Meyer et al. |
| 2019/0283753 | A1 | 9/2019 | Tatourian et al. |
| 2020/0011687 | A1 | 1/2020 | Lindemann et al. |

OTHER PUBLICATIONS

No More Second-Guessing: All-New Ford Mustang Mach-E Addresses Range Anxiety with Upgradeable Intelligent Range; Ford Media Center; Jun. 2020; 2 Pages.

A Social Approach for Predicting Distance-To-Empty in Vehicles, Chien-Ming Tseng, Sohan Dsouza, Chi-Kin Chau; Masdar Institute of Science and Technology, UAE; 2014; 2 Pages.

* cited by examiner

ELECTRIFIED VEHICLE CONTROL WITH DYNAMIC SEGMENT-BASED DISTANCE-TO-EMPTY (DTE)

TECHNICAL FIELD

This disclosure relates to systems and methods for controlling an electrified vehicle that include dynamic adjustments to estimated distance-to-empty (DTE) based on segment-based prediction of energy consumption.

BACKGROUND

Electrified vehicle driving range has increased over the last several years and may eventually alleviate driving range anxiety to improve electrified vehicle adoption rates. Distance-to-empty (DTE) is an estimate of range, or how far a vehicle can be driven before available energy is depleted. In an electrified vehicle, battery DTE is calculated based on the energy remaining in the high-voltage traction battery combined with some estimate of the vehicle's efficiency.

When DTE is estimated based only on backward-looking historical data, it may be inaccurate if a vehicle is used in different conditions than the conditions during which the historical efficiency was calculated. DTE accuracy may be improved using vehicle connectivity to obtain predictive data from a remote service to account for current and predicted ambient and operating conditions the vehicle is likely to encounter on a particular route or trip, such as weather and temperature conditions, predicted speeds based on real-time traffic data, and changes in road slope, for example.

However, even predictive DTE determinations do not typically account for predicted changes in energy consumption throughout the battery cycle, which is defined as energy remaining in the battery until the next time the vehicle is charged. DTE variations within a battery cycle that deviate from a 1:1 ratio of miles driven to miles deducted from DTE can cause customer concern or range anxiety that the predicted/reported DTE may not be actually achievable. Range anxiety may result even if the DTE at the beginning and end of a particular trip or route segment is accurately predicted. For example, while driving uphill the calculated and displayed DTE may decrease at a faster rate than the actual distance driven, resulting in concerns that the vehicle may not have enough range to reach the intended destination, particularly when the customer is not familiar with the remaining terrain or conditions along the route, which may include subsequent travel where the DTE either decreases at a slower rate or in some cases increases relative to the actual miles driven.

One approach to reducing range anxiety displays multiple estimates of DTE, such as a high, medium, and low estimate. This may result in drivers not trusting any of the estimates, or relying only on the most conservative or lowest estimate of DTE.

SUMMARY

In one or more embodiments, an electrified vehicle includes a traction battery, a human-machine interface (HMI), a transceiver configured to wirelessly transmit a trip destination received via the HMI and to wirelessly receive trip data from an external computer server, the trip data including a segment energy efficiency and an associated segment distance for each of a plurality of road segments of an associated route to the trip destination, and a controller in communication with the traction battery, the transceiver, and the HMI, the controller configured to communicate a distance-to-empty (DTE) for display by the HMI, the DTE based on the received segment energy efficiency and associated segment distance of each remaining segment in the trip. The controller may be further configured to calculate the DTE based on a remaining trip distance, available energy of the traction battery, an estimated traction battery energy required for the remaining trip distance, and an overall vehicle efficiency, the estimated traction battery energy being based on a combination of the received segment energy efficiency and associated segment distance of each remaining segment in the trip. The transceiver may be further configured to wirelessly transmit the trip destination in response to input via the HMI, and to wirelessly receive all the trip data for the associated route prior to the controller communicating the DTE for display. The HMI may be configured to display a single DTE.

In various embodiments, the controller is further configured to recalculate the DTE based on segment energy efficiency and associated segment distance for a plurality of segments received in response to a route change from a previously associated route for the trip destination. One or more of the road segments may be based on a combination of shorter road links to reduce the volume of trip data transmitted to the electric vehicle and/or to accommodate limited memory or other processor/controller resource constraints associated with the electric vehicle. Two or more road links may be combined into a road segment based on maximizing a difference between energy consumption of each road segment relative to an adjacent or immediately subsequent road segment along the route. Each road link may have associated energy consumption estimates for the traction battery associated with: propelling the electrified vehicle, climate control of the electrified vehicle, use of accessories in the electrified vehicle, and losses of the electrified vehicle. The energy consumption estimates may be combined to provide a single estimate for the road link, or alternatively, an energy consumption rate or efficiency per unit distance. Road segment distances may vary based on the associated number of constituent road links having similar energy consumption or efficiency. Road segment distances or lengths may be optimized by maximizing the difference between energy consumption of each road segment relative to other road segments of a route. In one or more embodiments, this is accomplished by maximizing standard deviation of a weighted energy segment corresponding to a segment length multiplied by a difference between estimated energy required for the segment and an average segment estimated energy requirement.

Embodiments may also include an electrified vehicle comprising a traction battery, an electric machine coupled to the traction battery and configured to propel the vehicle, a climate control system, at least one vehicle accessory powered by the traction battery, and a controller in communication with the traction battery and the electric machine, the controller configured to communicate a distance-to-empty (DTE) to a display of the electrified vehicle, the DTE based on trip data received from an external computing device, the trip data including a plurality of road segments associated with a selected route to a trip destination, each of the plurality of road segments including an associated segment distance and estimated energy consumption by the traction battery for: propelling the vehicle through the segment using the electric machine, operating the climate control system while traveling through the segment, and powering the at least one vehicle accessory while traveling through the segment, wherein the DTE is based on a remaining trip distance, available energy of the traction battery, an estimated traction battery energy required for the remaining trip distance based on the received trip data, and a vehicle efficiency. The vehicle may further include a human-machine interface (HMI) including the display, the HMI configured to receive input designating the trip destination and input designating the selected route to the trip destination. The vehicle may also include a transceiver configured to wirelessly transmit the trip destination to the external computing device and to wirelessly receive the trip data from the external computing device. Each of the plurality of road segments may comprise a combination of at least two road links that are combined to maximize a difference between energy consumption of each road segment relative to adjacent road segments associated with the selected route, which may include maximizing standard deviation of a weighted energy segment corresponding to a segment length multiplied by a difference between estimated energy required for the segment and an average segment estimated energy requirement.

One or more embodiments include a method for an electrified vehicle having an electric machine coupled to a traction battery to selectively propel the vehicle, the method comprising, by the electrified vehicle, receiving trip data from an external server, the trip data including a plurality of road segments of a selected route from a starting location to a destination, each road segment having an associated energy consumption estimate and distance, calculating a distance-to-empty (DTE) based on a remaining trip distance to the destination, available energy of the traction battery, an estimated traction battery energy required for the remaining trip distance, and an overall vehicle efficiency, the estimated traction battery energy being based on a combination of the received segment energy consumption and distance of each remaining segment in the trip, and communicating the DTE to a display within the electrified vehicle. The energy consumption for each of the plurality of road segments may include energy consumption estimates for the traction battery associated with propelling the electrified vehicle through the segment, climate control of the electrified vehicle while traveling through the segment, and/or use of accessories in the electrified vehicle during travel through the segment. The method may include transmitting the destination to the external server in response to selection of the destination via a human-machine interface of the electrified vehicle. The plurality of segments may have different distances and different associated energy consumption estimates or estimated energy efficiency or consumption per unit distance. The method may include recalculating the DTE based in response to a change in the selected route to the destination using associated road segments and estimated energy consumption received from the external computing device.

Embodiments according to the disclosure may provide one or more advantages. For example, by providing estimated or predicted energy consumption values for each of a plurality of corresponding segments of a route, the calculated and displayed DTE can more closely follow expected non-linearities in the predicted and actual energy consumption. Applying the segment-based energy consumption predictions dynamically as a trip progresses provides a dynamically accurate DTE estimate. As such, the DTE is not only accurate at the beginning and end of a planned route, but throughout segments having different energy consumption with actual distance traveled more closely matching reduction in DTE.

Display of a single DTE estimate that more closely tracks actual energy use for distances having varying energy use profiles rather than displaying a range of estimates or multiple estimates corresponding to a high, medium, and low estimate for example, may improve customer confidence in the DTE and reduce range anxiety. As such, reducing or minimizing changes to the displayed DTE by using a segment-based approach and updating the DTE only in response to pre-determined criteria, such as a route change or a reduction in DTE that exceeds a corresponding threshold may further increase customer confidence in the displayed DTE.

DETAILED DESCRIPTION

As required, detailed embodiments of the claimed subject matter are disclosed herein. However, it is to be understood that the disclosed embodiments are merely representative of the claimed subject matter and may be embodied in various and alternative forms that may not be explicitly described or illustrated. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 2:
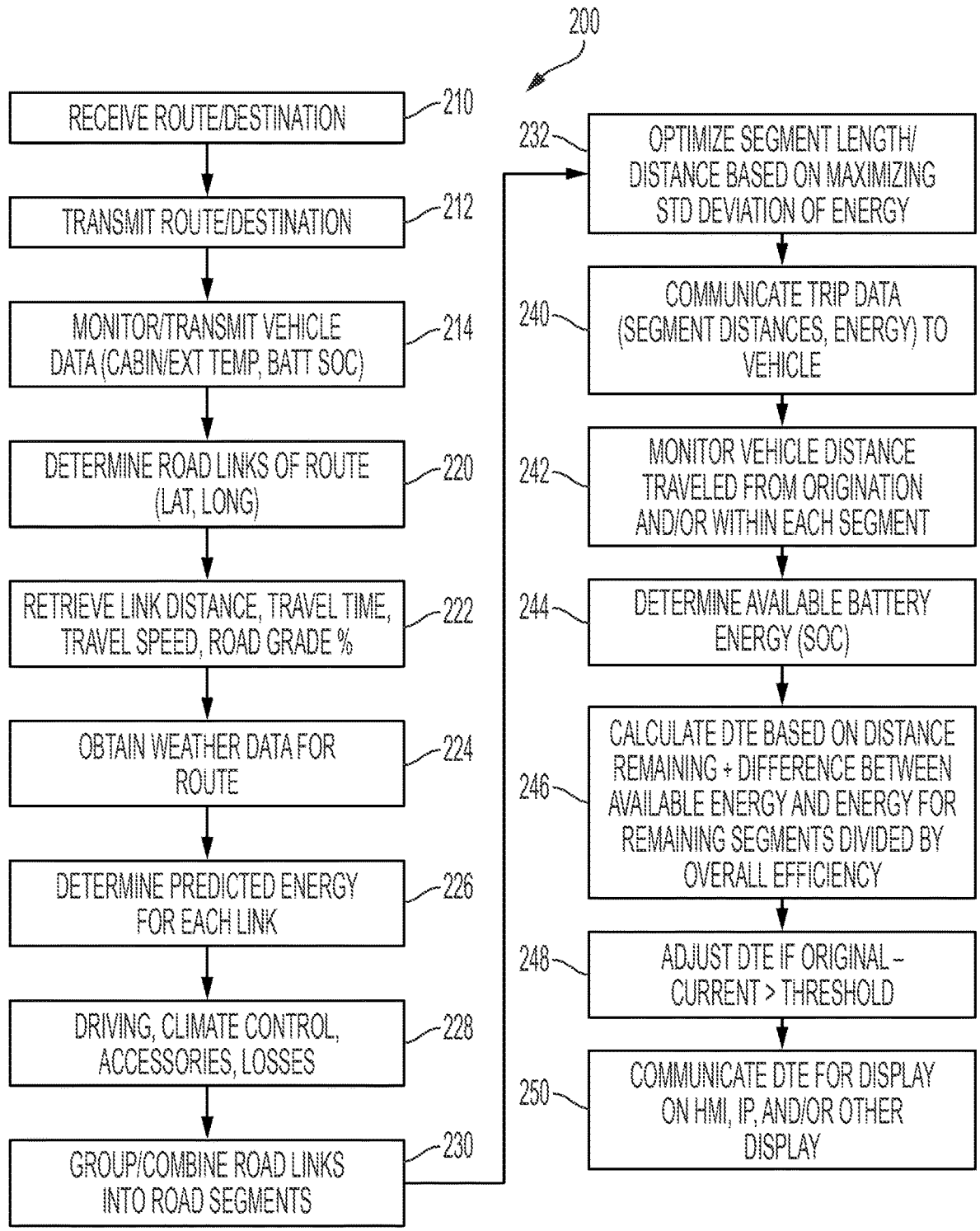
FIG. 2 is a flow chart illustrating operation of a system or method for dynamic adjustment to DTE estimation based on segment-based prediction of energy consumption.
Figure 4:
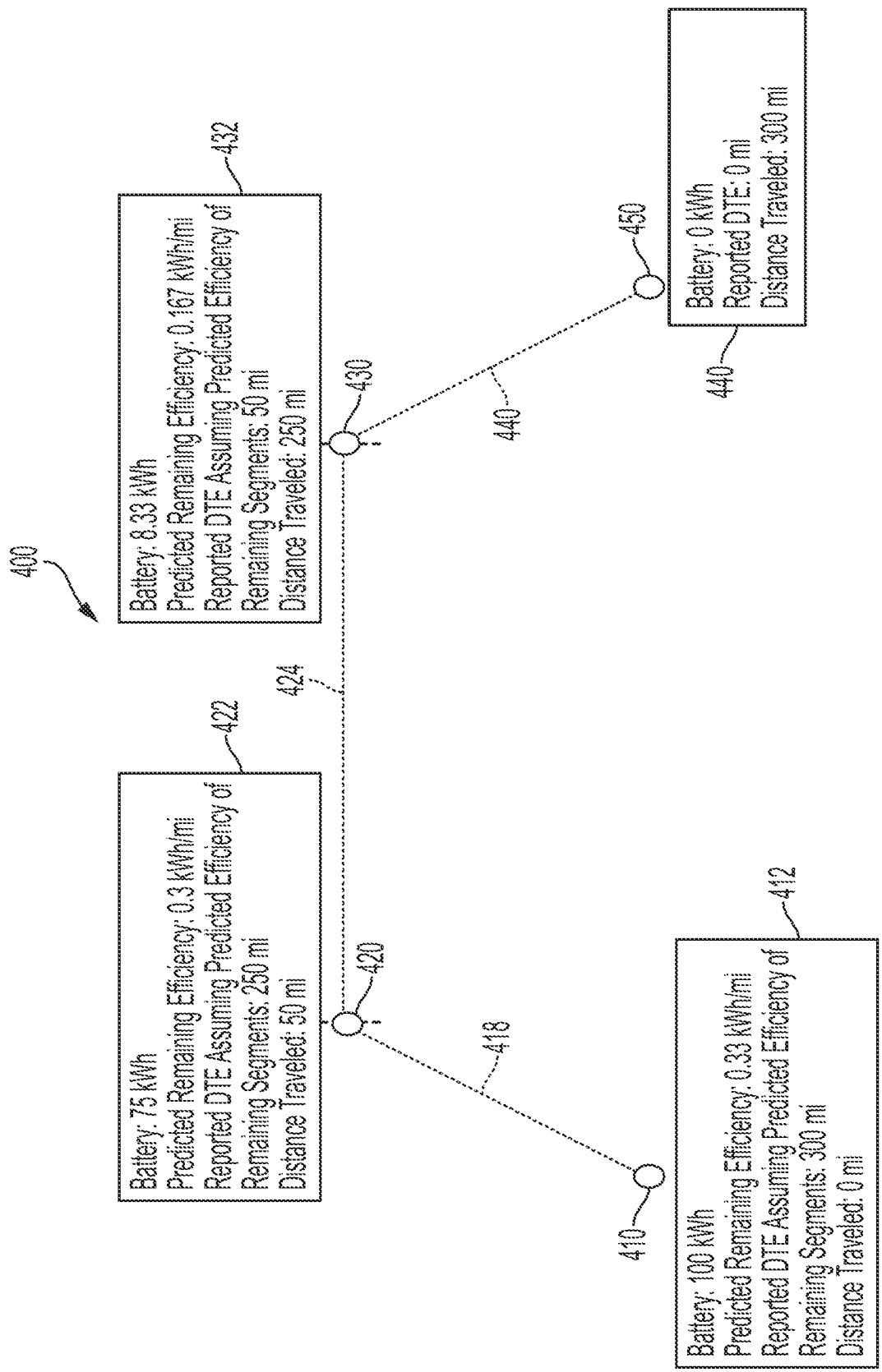
FIG. 4 illustrates DTE during operation of an electrified vehicle having dynamic adjustment to DTE estimation based on segment-based prediction of energy consumption along the same representative route as illustrated in FIG. 3.

A dynamic adjustment to distance-to-empty (DTE) along a route based on energy consumption of current and future segments according to one or more embodiments of the present disclosure ensures that the displayed DTE reflects a 1:1 relationship between distance driven and DTE deducted, which provides an improved customer experience compared to DTE adjustments that may be correct only for the entire trip and may only be accurate at the start and end of the trip. To accomplish this accuracy, the DTE system estimates or predicts the expected battery drop throughout the vehicle's future battery cycle, not just at a single point in time (i.e. the destination). Prior art strategies that provide a predicted DTE based on an average energy consumption of a trip incorrectly assume energy usage to be linear for the battery cycle. As such, the DTE may be correct at the beginning and end of the trip, but may vary inconsistently throughout the route depending on a number of factors. A representative prior art strategy for determining DTE is illustrated in FIG. 2 and described in greater detail below. In contrast, one or more embodiments of the present disclosure provide more granular segment-based energy consumption values so that the energy use per unit distance (mi or km for example), which may vary significantly over a particular route, can more closely follow any non-linear usage profile. The resulting DTE displayed to the customer more closely reflects the energy used for the distance traveled and may improve customer confidence and reduce range anxiety. Operation of a segment-based DTE strategy according to embodiments of the present disclosure is illustrated in FIG. 4 and described in greater detail below.

As used herein, the DTE may be calculated or determined by the electrified vehicle based on segment-based trip data including segment-based predicted energy consumption or consumption rate received from an external computing device, such as a cloud server or multiple cloud-based servers, for example. The DTE may be determined or calculated by a program, application, and/or some combination of software and hardware that is incorporated or stored on one or more of the components that comprise the vehicle's operating system. Although the present description references a battery electric vehicle (BEV), it is within the scope of the present disclosure to apply the DTE prediction tool to other types of electrified vehicles such as hybrid electric vehicles (REV), particularly plug-in HEVs. The predicted energy consumption rate and the energy consumption estimates referenced herein for calculating the DTE driving range prediction may correspond to average energy consumptions for operating the vehicle's propulsion system, and/or to average energy consumptions for operating one or more non-propulsion vehicle systems and/or vehicle components depending on the particular application and implementation.

As used herein, electrified vehicles rely, at least in part, on one or more energy stores, such as batteries for powering the propulsion of the vehicle. Some implementations may use various energy sources to power a generator or otherwise generate electrical energy, such as fuel cell vehicles, for example. The predicted energy consumption rate and/or energy consumption estimate may be generated by the DTE prediction tool in terms of amount of battery energy predicted to be consumed in terms of an energy usage amount (e.g., kWh, Joules, or other similar unit of energy usage) by one or more vehicle batteries that are included in the vehicle system. The vehicle may generate a DTE prediction based on the summation of the predicted energy consumption rate for propulsive vehicle components and non-propulsive vehicle components in some embodiments as described in greater detail herein.

The present disclosure generally provides for a plurality of circuits or other electrical devices. All references to the circuits and other electrical devices, computers, controllers, etc. and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer-program that is embodied in a non-transitory computer readable medium that is programed or configured to perform any number of the functions as disclosed.

Figure 1:
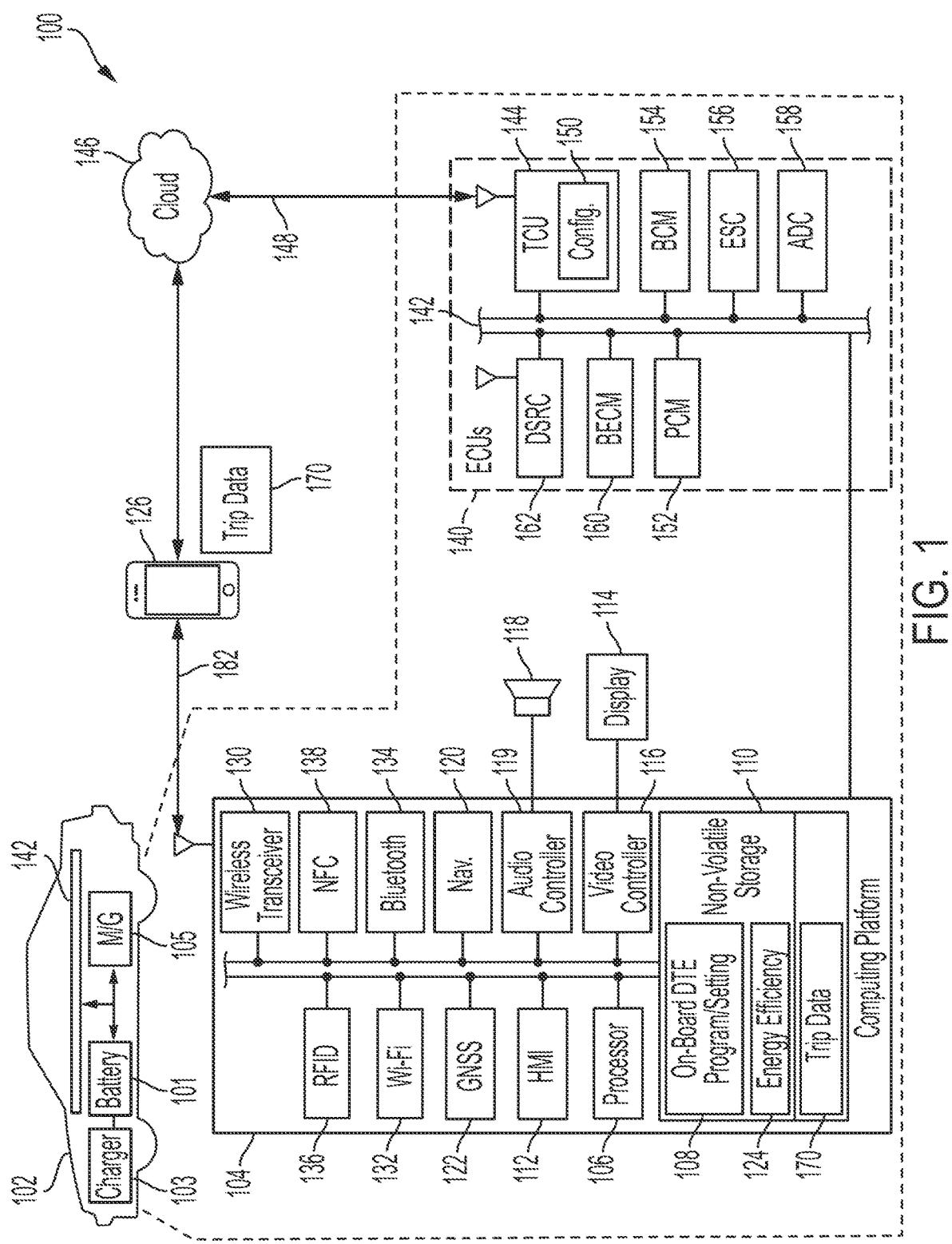
FIG. 1 is a block diagram illustrating representative embodiments of an electrified vehicle system or method for dynamic adjustment to DTE estimation based on segment-based prediction of energy consumption.

FIG. 1 illustrates an example system 100 including an electrified vehicle 102 having a traction battery 101 and an associated battery charger 103. Vehicle 102 is configured to access one or more external cloud servers 146 and/or a mobile device 126 to transmit vehicle and ambient operating data and receive trip data including a plurality of road segments and associated predicted energy consumption or energy efficiency data used in providing a segment-based DTE for display via a human-machine interface 112 and/or separate display 114, for example. Vehicle 102 may include a computing platform 104 that provides telematics services including navigation, turn-by-turn directions, vehicle health reports, utility or charging rates, and hands-free calling, for example. In one example, vehicle 102 may include the SYNC system manufactured by The Ford Motor Company of Dearborn, MI It should be noted that the illustrated system 100 is merely an example, and more, fewer, and/or differently configured or positioned elements or components may be provided depending on the particular application and implementation.

In some embodiments, electrified vehicle 102 may be a battery electric vehicle (BEV) powered only by a high voltage traction battery 101 and one or more electric machines 105 that may be operated as a motor/generator selectively drawing power from or charging high voltage traction battery 101. In other embodiments electrified vehicle 102 may be a hybrid electric vehicle (HEV) powered by an internal combustion engine in combination with one or more electric machines that may each operate as a motor and/or generator. In various embodiments, traction battery 101 may be a high-capacity or long-range traction battery that provides a driving range of at least 100 miles when fully charged. For HEV embodiments, including plug-in HEVs, the vehicle may have various powertrain configurations including a series hybrid configuration, a parallel hybrid configuration or a parallel/series hybrid configuration, for example. Vehicle 102 may include various types of transmission or gear box configurations including a powersplit configuration, a continuously variable transmission (CVT), or a step-ratio transmission, for example. The segment-based DTE for an electrified vehicle receiving trip data including road segments and associated predicted energy use of for a traction battery from an external computing device or server 146 according to the present disclosure is generally independent of the particular type of vehicle or implementation of the particular vehicle powertrain.

As illustrated in FIG. 1, a computing platform 104 may include one or more processors 106 configured to execute instructions, commands, and other routines in support of the processes, functions, or algorithms described herein. For example, the computing platform 104 may be configured to execute instructions of vehicle applications including on-board vehicle DTE calculations and determinations based on trip data 170 received from an external server or computing device as represented at 108 to provide various features as described herein including selectively wirelessly transmitting a trip destination and/or selected route to a trip destination to an external computing device or cloud server 146 for storage and processing to identify road links and associated predicted energy consumption data packaged as trip data 170 wirelessly transmitted to electrified vehicle 102 as described herein.

Vehicle operating data and/or ambient data such as cabin temperature, climate control status, accessory use, ambient temperature, battery state of charge (SOC), trip destination and/or selected route, etc. may be transmitted to the external computing device or cloud server 146 either directly or from an associated or connected handheld mobile device 126, such as a smart phone for example. Trip data 170 received from the external computing device or cloud server 146 either directly or via an associated mobile device 126 may be maintained in a non-volatile or persistent manner using a variety of types of computer-readable storage media 110. The computer-readable media 110 (also referred to as a processor-readable medium or storage) includes any non-transitory medium (e.g., tangible medium) that participates in providing instructions or other data, settings, or parameters that may be read or accessed by the controller or processor 106 of the computing platform 104 to calculate and instruct display of a dynamically updated segment-based single DTE. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL, for example.

The computing platform 104 may be provided with various features allowing the vehicle occupants/users to interface with the computing platform 104 and to enter trip information including a trip destination, or select a route generated by navigation system 120. Routing information may also be received from an external computing device or server such as smart phone 126 or cloud 146. For example, the computing platform 104 may receive input from human-machine interface (HMI) controls 112 configured to provide for occupant interaction with the vehicle 102. As an example, the computing platform 104 may interface with one or more software or hardware buttons (not shown) or other HMI controls configured to invoke functions on the computing platform 104 (e.g., steering wheel audio buttons, a push-to-talk button, instrument panel controls, climate control settings, etc.). HMI 112 may include one or more video screens or displays to present DTE information to the driver/occupants, such as display 114 or a connected/coupled display of a mobile device 126. Portions of HMI 112 may be integrated into the vehicle instrument panel for display of information, such as DTE, and/or receiving user input. Computing platform 104 may also receive information from various vehicle sensors associated with operation of traction battery 101, M/G 105, climate control, vehicle accessories, and the like.

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with a vehicle audio system including one or more speakers 118 configured to provide audio output to vehicle occupants by way of an audio controller 119. One or more microphones may be provided for speech input and processing, such as specifying a trip destination, selecting a route, or otherwise interfacing with systems, such as navigation system 120, for example.

The computing platform 104 may also be provided with navigation and route planning features through a navigation controller or system 120 configured to suggest navigation routes responsive to user input of a trip destination via e.g., the HMI controls 112, and output planned routes and instructions via the speaker 118 and the display 114. Trip destination and associated route planning or actual route/trip data as well as planned and/or actual vehicle charging data, battery SOC, climate control use, accessory use, energy efficiency, etc. may be selectively transmitted to an external cloud server 146 for use in collecting crowd-sourced data associated with determining a predicted energy consumption or efficiency associated with particular road links, ambient temperatures, weather, traffic, etc. Alternatively, route planning and suggestions may be determined by external cloud server 146 and transmitted to computing platform 104 based on a desired, predicted, or historical destination, for example. Location data that is utilized for navigation or to determine vehicle data, trip data, traffic, etc. may be collected from a global navigation satellite system (GNSS) controller 122 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data, and/or stored by external cloud server 146 and communicated to computing platform 104 periodically or in response to a particular request or event. Navigation software may be stored in the storage 110. Alternatively, navigation software and configuration data (e.g. preferences, saved addresses or the like) may be stored individually within the navigation controller 120 provided with non-volatile storage medium (not shown). Location data may also be used to provide anticipated ambient temperatures and to learn or otherwise process vehicle trip data associated with energy consumption, driving habits, driving terrain, traffic, etc. to provide segment-based DTE as described herein.

The computing platform 104 may be configured to wirelessly communicate with a mobile device 126 of a vehicle user/occupant via a wireless connection 128 through a wireless transceiver 130. The mobile device 126 may be any of various types of portable computing device, such as cellular phones, tablet computers, smart watches, laptop computers, or other device having a processor coupled to a memory and configured for communication with the computing platform 104 to communicate vehicle data to the external cloud server 146. Similarly, mobile device 126 may be used to receive trip data including segment distance and predicted energy consumption and/or rate per unit distance from the external cloud server 146 and communicate the data to the computing platform 104. Alternatively, vehicle computing platform 104 may directly wirelessly communicate with the external cloud server 146 via an associated transceiver 130. The wireless transceiver 130 may be in communication with a Wi-Fi controller 132, a Bluetooth controller 134, a radio-frequency identification (RFID) controller 136, a near-field communication (NFC) controller 138, and other controllers such as a Zigbee transceiver and/or an IrDA transceiver (not shown), and configured to communicate with a compatible wireless transceiver of the mobile device 126.

The computing platform 104 may be further configured to communicate with vehicle controllers that may include various electronic control modules or units (ECUs) 140 via one or more in-vehicle networks 142. The in-vehicle network 142 may include, but is not limited to, one or more of a controller area network (CAN), an Ethernet network, and a media-oriented system transport (MOST), as some examples.

ECUs 140 may include a telematics control unit (TCU) 144 configured to control telecommunication between vehicle 102 and external cloud server 146 through a wireless connection 148 using a modem (not shown). The external cloud server 146 may include one or more servers or computers connected via various types of wired or wireless networks (e.g. the Internet). It is noted that the term cloud is used as a general term throughout the present disclosure and may refer to any external computing device or cloud-based services involving multiple servers, computers, devices and the like. In various embodiments, external cloud server 146 collects vehicle data, weather data, traffic data, etc. from multiple vehicles and analyzes the data to determine an anticipated or predicted energy consumption to operate the vehicle over a corresponding road link, which may include both propulsive energy and non-propulsive energy depending on the particular application and implementation. External cloud server 146 may use any processing strategies including artificial intelligence (AI), machine learning, neural networks, and the like to process the vehicle data and related data to determine the estimated or predicted energy consumption or rate of consumption over a particular road link as described herein. The present disclosure is generally independent of the particular processing strategies.

The TCU 144 may be provided with a local non-volatile storage (not shown) configured to record and store TCU configuration data 150 for the TCU 144. The configuration data 150 may include various data related to the settings of the TCU 144. As a few non-limiting examples, the configuration data 150 may include an identification, network settings to connect to the cloud 146, data package subscriptions, notification preference, vehicle identification data, vehicle battery charge data, or the like.

The ECUs 140 may further include a powertrain control module (PCM) 152 configured to monitor and control the powertrain operation of the vehicle 102. For example, the PCM 152 may be configured to control operation of at least one electric machine 105 operable as a motor/generator (M/G) to provide propulsive power to the vehicle. Settings and user preferences may be stored in a local storage as PCM configuration data for the PCM 152. In embodiments of electrified vehicles having a step-ratio transmission, PCM 152 may control a shift schedule or shift feel of the transmission.

The ECUs 140 may further include a body control module (BCM) 154 configured to monitor and control chassis or body operations of the vehicle 102. For example, the BCM 154 may be configured to control and monitor vehicle body functions such as door lock/unlock, vehicle occupancy, blind spot monitoring or the like using signals detected via one or more sensors (not shown). Similarly, configurations for the BCM 154 may be stored as BCM configuration data (not shown) in the BCM 154.

The ECUs 140 may further include electronic stability controls (ESC) 156 configured to monitor vehicle operation status using signals from the speed sensor (not shown) and control the stability of the vehicle operation whenever needed such as by activating anti-lock brakes (ABS), traction controls or the like based on the selected vehicle profile. Configurations and settings of the ESC 156 may be stored as ESC configuration data locally in a non-volatile storage medium. The ECUs 140 may further include an autonomous driving controller (ADC) 158 configured to monitor and control any autonomous driving features of the vehicle 102, which may vary based on the particular application and/or the selected vehicle profile.

The vehicle 102 may be further provided with a battery electronic control module (BECM) 160 to control cell balancing, charging, discharging, and other operations of a vehicle traction battery. BECM 160 may be connected to the in-vehicle network 142 and configured to communicate with various ECUs 140 of the vehicle 102 and collect data therefrom. The BECM may provide data to monitor or calculate a battery health of life (HOL) based on published calculation strategies. The BECM may also measure various battery parameters such as cell voltage, current, and or resistance to monitor battery operation and performance. The BECM 160 may be connected to the in-vehicle network 142 via a connecting port such as an OBD-II connector (not shown). Alternatively, the one or more ECUs 140, including BECM 160 may be integrated with the computing platform 104 and communicate with the in-vehicle network 142 directly. BECM 160 may communicate an SOC or other data to determine the currently available battery energy for use in determine a segment-based DTE as described herein.

The ECUs 140 may further include a dedicated short-range communication (DSRC) controller 162 configured to wirelessly communicate with compatible controllers of other vehicles or digital entities.

As generally illustrated in FIG. 1, an electrified vehicle 102 includes a traction battery 101, an electric machine 105 coupled to the traction battery 101 and configured to propel the vehicle 102. The vehicle 102 also includes a climate control system and at least one vehicle accessory powered by the traction battery 101. One or more controllers 106, 140 are in communication with the traction battery 101 and the electric machine 105 via a wired or wireless vehicle network 142. The one or more controllers 106, 140 are configured to communicate a distance-to-empty (DTE) to a display 114 of the electrified vehicle 102, the DTE based on trip data received from an external computing device 146. The trip data include a plurality of road segments associated with a selected route to a trip destination. Each of the plurality of road segments may include an associated segment distance and estimated energy consumption by the traction battery 101 for: propelling the vehicle 102 through the segment using the electric machine 105, operating the climate control system while traveling through the segment, and powering the at least one vehicle accessory while traveling through the segment. The DTE is calculated or otherwise determined based on a remaining trip distance, available energy of the traction battery 101, an estimated traction battery energy required for the remaining trip distance based on the received trip data, and a vehicle efficiency.

FIG. 2 is a flow chart illustrating operation of representative embodiments of a system or method for segment-based DTE reporting for an electrified vehicle. The processes, methods, algorithms, or logic disclosed can be deliverable to or implemented by an on-board vehicle and/or a remote/external processing device, controller, or computer, which can include any existing programmable electronic control unit or dedicated electronic control unit or circuitry. Similarly, the processes, methods, or algorithms can be stored as data and instructions executable by a controller or computer in many forms including, but not limited to, information permanently stored on non-writable storage media such as ROM devices and information alterably stored on writeable storage media such as flash memory, magnetic tapes or disks, optical tape or disks, RAM devices, and other magnetic, optical, and combination media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

With regard to the operation of the functions, processes, systems, methods, etc. described, although the steps of such processes, etc. may be described as occurring in a particular ordered sequence, such processes could be practiced with the described functions or steps performed in an order other than the order illustrated and described. It further should be understood that certain steps could be performed simultaneously, that other steps could be added, or that certain steps described herein could be omitted. One or more steps or functions may be repeatedly performed whether or not explicitly illustrated or described as such. In other words, the descriptions of processes herein are provided for the purpose of illustrating certain embodiments, and should in no way be construed as required or necessary to the claimed subject matter other than the explicit limitations found therein.

Segment-based DTE system or method 200 includes receiving trip information for an electrified vehicle at 210. The trip information may include a trip destination and/or a selected route from an origination point, which could be the current vehicle location, to the trip destination. The trip information may be entered using a vehicle HMI or coupled computing device, such as a smart phone, for example. One or more routes may be determined by an on-board vehicle navigation system and presented to a user for selection of a preferred route. Alternatively, a connected device or external computer, such as a cloud server may determine available or suggested routes and transmit them to the electrified vehicle for display on a vehicle HMI, instrument panel, etc. The selected route information is transmitted to an external computing device as represented at 212. In some embodiments, vehicle and/or ambient data may be communicated to the external computing device at 214, such as vehicle cabin temperature, external ambient temperature, and various parameters of the vehicle traction battery, which may include battery energy available or SOC, for example.

The external computing device determines road links associated with the selected route as represented at 220. In one embodiment, each road link is defined by a beginning and ending latitude and longitude pair. Each road link contains previously determined data for its distance, predicted travel time, predicted travel speed, and road grade percentage as represented at 222. The external computing device may also query the forecasted external temperature of each road link within the selected route from a weather API based on the road link location, anticipated time that the vehicle will traverse the road link, and the anticipated travel time across the road link as indicated at 224. Because the energy consumption predictions are based on characteristics of the known route (speed, grade, temperature), predictions can be generalized to any route in which the preceding conditions are known. The external computing device uses learned data from the electrified vehicle control modules (energy for driving on speed/grade classes) of one or more vehicles to estimate energy consumption on future drive cycles. The external computing device can therefore predict energy consumption for any route based on an estimated speed/grade trace based on traffic and mapping data along the route, current/forecasted external temperature, initial battery energy available, and initial cabin temperature. In this way, predictions can be generalized to any route in which the preceding conditions are known using one or more strategies understood by those of ordinary skill in the art.

The external computing device estimates or predicts energy consumption for each road link based on previously stored data from multiple vehicles and may adjust for vehicle/trip specific data of a particular vehicle, such as temperatures, weather, etc. as indicated at 226. This energy consumption prediction may include various categories. In one embodiment, the energy consumption prediction includes energy for driving or propelling the vehicle, energy for operating the climate control system of the vehicle, energy for operating vehicle accessories, and energy for external losses as indicated at 228. The energy for driving is based on the predicted speed/road grade of the road link, and the learned energy consumption for driving on road links at the respective speed/grade class. The energy for climate control is based on the learned steady state power use at the external temperature of the road link, as well as the learned transient energy at the initial external temperature and initial cabin temperature of the vehicle. If the cabin temperature is very low and the target temperature is high, there may be a large transient climate energy consumption for any road links at the beginning of the trip. The energy for accessories is based on the expected time duration to traverse the road link. The energy for external losses is based on the forecasted external temperature for each road link and the learned steady state power loss at the respective temperatures. The external loss category may also include a transient energy component that is based on the initial external temperature for at the start of each link.

Because data such as traffic, elevation, and weather forecasts that may be used to provide an improved prediction for DTE are typically not available with fine granularity, as well as memory storage and processing constraints in some electrified vehicles, the number of road links and related data transmitted to the vehicle may be limited. As such, road links having similar characteristics may be combined to form road segments of the route as represented at 230. The segment size or distance may vary for segments within a route rather than grouping links into segments of similar size/distance. In one embodiment, the road links are combined/grouped into segments to further improve the dynamic accuracy of DTE estimates. The external computing device uses a segmentation algorithm that optimizes the length/distance of each segment to maximize the differences in energy consumption between segments as indicated at 232. In one embodiment, the extent to which segments reflect significant differences in energy consumption across segments is measured with the standard deviation of segment length multiplied by distance from average energy consumption for the trip. In this way, the distance of the segments is not fixed, and is optimized on the predicted energy consumption values. Variation in energy consumption values provides the data needed to drive a dynamic DTE estimate by assigning segment lengths that maximize variation across segments, with each segment representing a portion of the route with similar energy consumption characteristics. In one embodiment, segment length for a weighted energy segment is optimized by maximizing standard deviation of the segment length multiplied by the absolute value of the difference between the average energy consumption and the segment energy consumption according to:

$$\text{weighted energy segment} = \text{segment length} * \text{abs}(E_{segment} - E_{avg})$$

By providing different predicted energy consumption values for each of a plurality of segments, the predicted battery consumption can more closely follow a non-linear curve so that the distance traveled and DTE calculated and displayed in the vehicle more closely track one another, particularly for interim portions of a trip having varying energy consumption or efficiency associated with driving and/or non-propulsive energy consumption. The trip data including segment distance and energy consumption or efficiency for each of a plurality of segments forming the route are then wirelessly communicated from the external computing device to the electrified vehicle as indicated at 240. The trip data received from the external computing device may be stored in one or more non-transient computer readable storage media as previously described. In one embodiment, trip data are communicated to the electrified vehicle only once at the beginning of the trip, or whenever the driver deviates from the route and there is a route recalculation.

The electrified vehicle tracks distance traveled within the trip and within each segment as represented at 242. Energy available in the electrified vehicle traction battery or battery SOC is determined as represented at 244. The electrified vehicle then calculates or otherwise determines the DTE based on the trip distance remaining added to the difference between the battery energy available and the battery energy required for the remaining trip distance divided by the overall vehicle efficiency as represented at 246 according to:

$$DTE = D_{trip\_remaining} + \frac{E_{battery\_available} - E_{trip\_remaining}}{\eta_{beyond}}$$

Where: $D_{trip\_remaining}$ represents the remaining distance in the trip [miles];

$E_{battery\_available}$ represents the current battery energy available [Kilowatt-hours];

$E_{trip\_remaining}$ represents the current predicted energy left in the trip [Kilowatt-hours]; and $\eta_{beyond}$ represents the overall vehicle energy efficiency beyond the trip [Kilowatt-hours/miles].

The calculated DTE may be compared to the DTE determined at the beginning of the trip (or most recent re-routing determination) as adjusted based on the trip distance already traveled as represented at 248. If the difference between the calculated DTE and the trip-adjusted DTE exceeds a threshold, such as 25 miles in one embodiment, then the most recently calculated DTE will be communicated for display on the HMI as indicated at 250. Otherwise, the trip-adjusted DTE may be communicated for display on the HMI, instrument panel, or other display as indicated at 250. Stated differently, DTE changes due to differences between cumulative predicted energy consumption and cumulative actual energy consumption may not be communicated to the HMI for display until the difference exceeds a corresponding threshold, such as 25 miles, for example.

Figure 3:
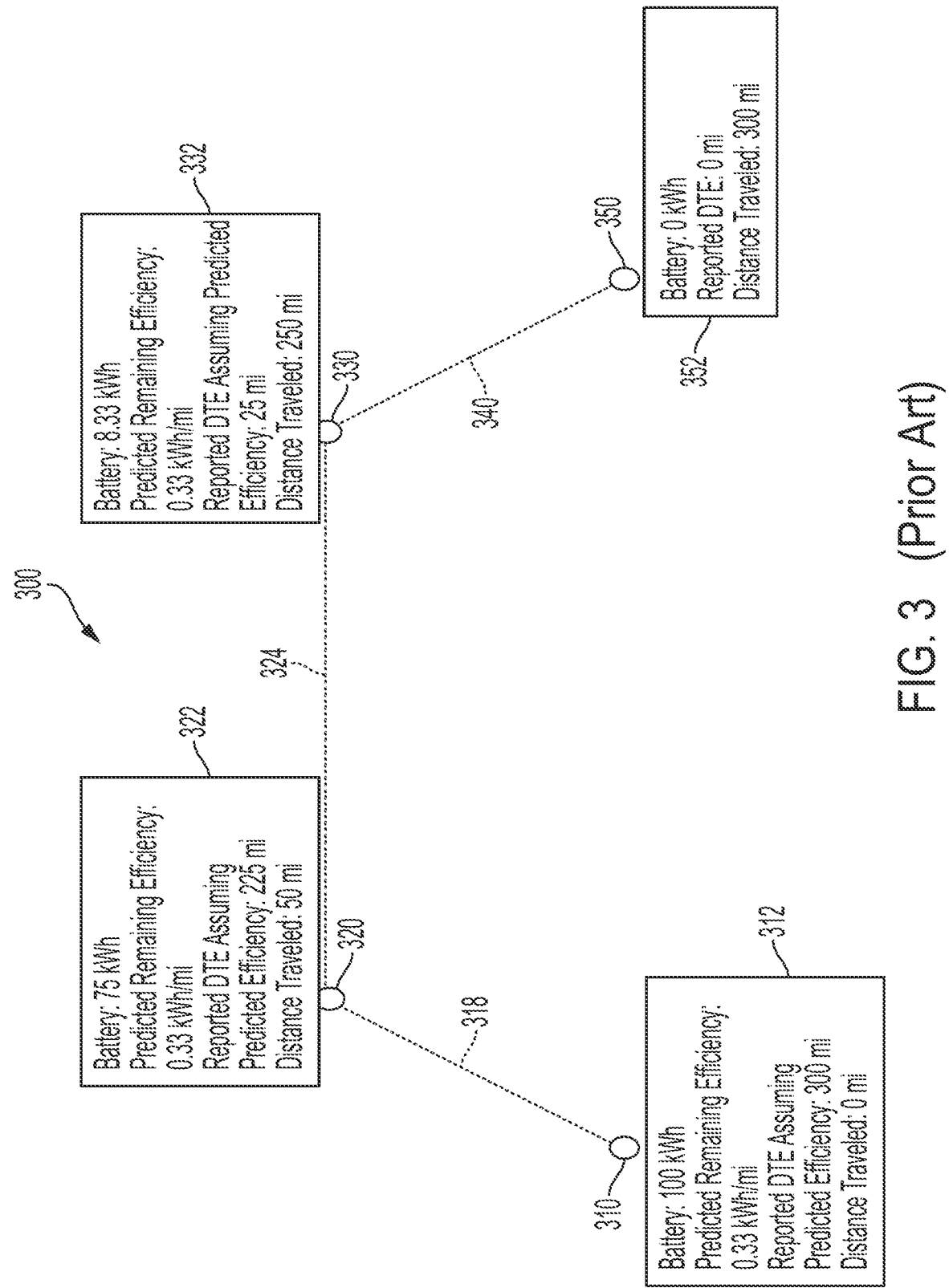
FIG. 3 illustrates DTE fluctuations resulting from a prior art implementation for displaying DTE along a representative route having non-linear energy consumption.

FIG. 3 illustrates a prior art implementation for displaying DTE where DTE fluctuations may lead to customer uncertainty and range anxiety along a representative route having non-linear energy consumption. As a simple example for a representative trip generally indicated at 300 over a route having varying or nonlinear energy consumption profiles between an origination 310 and a trip destination 350, an electrified vehicle battery may be charged to 100 kWh energy with an overall average efficiency of 0.33 kWh per mile. The overall average efficiency may be learned from historical data that may or may not be specifically associated with the trip 300 or a particular route for the trip, and may or may not include non-propulsive energy consumption. This would result in a calculated DTE of 300 miles. The beginning vehicle and trip parameters for this example are indicated at 312. Representative trip 300 is a 300 mile trip that would therefore use all of the battery's available energy.

Trip 300 includes a first 50 mile portion 318 from origination 310 to an interim point 320 through hilly terrain with increasing elevation, requiring more energy per mile of driving than flat or downhill driving with an energy consumption rate or efficiency of 0.5 kWh/mi. This results in the DTE decreasing more quickly than 1 mile per mile driven. More particularly, traversing the first portion 318 with an efficiency of 0.5 kWh/mi consumes 25 kWh of battery energy leaving 75 kWh available. Because the historical overall efficiency of 0.33 kWh/mi does not change rapidly to reflect the most recent miles driven, the displayed DTE drops to 225 miles from the initial 300 miles after driving only 50 miles as indicated at 322. From the customer perspective, the vehicle lost 75 miles of range even though only 50 miles were driven. If this pattern continues, the customer might estimate an actual range of only 200 miles, for example, even if the range ends up being exactly 300 miles due to the variations throughout the trip.

Continuing with the prior art example of FIG. 3, the trip includes a second portion 324 between interim point 320 and interim point 330 spanning 200 miles across generally flat terrain (0% grade), and the vehicle consumes 0.33 kWh/mi as reflected by the overall historical average (or average for the route) using an additional 67.7 kWh. Only 8.33 kWh remains in the battery upon reaching point 330 as reflected by vehicle parameters in block 332. As such, after 200 miles of flat driving, the reported DTE has decreased another 200 miles, leading to a reported range of 25 miles. However, at this time the customer has 50 additional miles to reach trip destination 350. The last portion of the trip is generally downhill with an actual efficiency of 0.167 kWh/mi with some energy recaptured by regenerative braking. As such, the final 50 miles can be completed with only 8.33 kWh remaining in the battery because this segment of the trip has low energy consumption. During this segment, the DTE value of 25 miles decreases by only 1 mile for every 2 miles driven with the vehicle parameters at the destination 350 indicated at 352.

As illustrated in FIG. 3, the DTE for trip 300 using a prior art strategy was exactly as expected at the beginning point 310 and trip destination 350 with 300 miles driven and 100 kWh consumed for an average efficiency of 0.333 kWh/mi. However, the interim or dynamic efficiency experienced during the trip led to variations in DTE relative to actual distance traveled, i.e. the trip did not provide a 1:1 correlation between miles driven and reduction of DTE miles.

As illustrated by the representative embodiments described with respect to FIGS. 1 and 2, instead of predicting an overall energy consumption for the entire trip, the DTE support system implemented by a remote computer or cloud-based network will provide the vehicle module an energy consumption prediction for each road segment of the route. The road segments are used to dynamically update DTE displayed in the vehicle as the trip progresses. Using the length/distance and associated energy consumption of each segment received from the remote computer, the remaining trip energy consumption can be updated in real-time by tracking the distance traveled within each segment, and the DTE can be updated using the remaining predicted trip energy and real-time battery energy available. As such, when a segment is completed, the predicted energy consumption for that segment is no longer included in calculating the remaining trip energy consumption. As the number of segments increases, the dynamic accuracy of the DTE algorithm throughout the battery cycle is expected to increase.

FIG. 4 illustrates operation of an electrified vehicle having dynamic adjustment to DTE estimation based on segment-based prediction of energy consumption along the same representative route as illustrated in FIG. 3. The representative trip generally indicated at 400 assumes the same route as the trip illustrated in FIG. 3 having varying or nonlinear energy consumption profiles between origination 410 and trip destination 450. The electrified vehicle traction battery is charged to 100 kWh energy with an overall average efficiency (also referred to as efficiency beyond the trip) of 0.33 kWh per mile resulting in depletion of the battery at the end of the trip. The trip data including segment lengths and corresponding predicted segment energy consumption are determined by the external computing device and downloaded to the electrified vehicle at the beginning of the trip. As previously described, the segment lengths are optimized by the external computing device by combining constituent road links to maximize the difference between segment energy efficiency or consumption resulting in three segments 418, 424, 440 for this trip having trip data including segment lengths and energy efficiency or consumption rates of: 50 mi, 0.5 kWh/mi; 200 mi, 0.33 kWh/mi; and 50 mi, 0.167 kWh/mi, respectively.

Trip 400 includes a first segment 418 having a segment distance or length of 50 miles between origination 410 to the end of the first segment and beginning of the second segment at 420 through hilly terrain with increasing elevation, requiring more energy per mile of driving than flat or downhill driving with an energy consumption rate or efficiency of 0.5 kWh/mi. A second segment 424 begins at 420 and ends at 430 spanning 200 miles across generally flat terrain (0% grade), with the trip data predicted efficiency of 0.33 kWh/mi. Trip/vehicle related data at the beginning of the second segment is represented at 422, and at the end of the second segment 424 and beginning of the third segment 440 represented at 432. The ending trip/vehicle related data is represented at 452.

As illustrated in FIG. 4, when the electrified vehicle receives the trip data including the segmented energy efficiency predictions and distances, the DTE can be calculated as described above with reference to FIG. 2. The representative trip spans 300 miles with an overall average vehicle and/or trip efficiency of 0.333 kWh/mile and begins with 100 kWh battery energy available. The overall energy efficiency or beyond trip energy efficiency used in the calculation can be estimated using driving habits of a particular vehicle/driver, type of vehicle, or other crowd-sourced trip data.

As indicated by block 412, at the beginning of the trip:

$$D_{trip\_remaining}=300 \text{ miles}; E_{battery\_available}=100 \text{ kWh}; \eta_{beyond}=0.333 \text{ kWh}$$

To calculate $E_{trip\_remaining}$, the predicted segment efficiencies and distances as received in the trip data from the external computing device corresponding to 50 mi, 0.500 kWh/mi; 200 mi, 0.333 kWh/mi; and 50 mi, 0.167 kWh/mi for segments one, two, and three, respectively. As such at the beginning of the trip:

$$E_{trip\_remaining}=(50*0.500)+(200*0.333)+(50*0.167)=100 \text{ kWh}$$

and the corresponding DTE at the beginning of the trip for the vehicle/trip data of block 412 is:

$$DTE_{initial}=300 \text{ mi}+(100-100) \text{ kWh}/(0.333 \text{ kWh/mi})=300 \text{ mi}$$

At the end of the first segment 418, the DTE is calculated using the vehicle/trip data of block 422 and according to:

$$DTE_{after\_seg1}=250 \text{ mi}+(75-75)\text{kWh}/(0.333 \text{ kWh/mi})=250 \text{ mi}$$

Similarly, at the end of the second segment 424 using trip/vehicle data of block 432, the DTE is calculated as:

$$DTE_{after\_seg2}=50 \text{ mi}+(8.4-8.4)\text{kWh}/(0.333 \text{ kWh/mi})=50 \text{ mi}$$

Likewise, at the end of the third segment 440, the DTE is calculated as:

$$DTE_{after\_seg3}=0 \text{ mi}+(0-0)\text{kWh}/(0.333 \text{ kWh/mi})=0 \text{ miles}$$

Segment-based DTE according to embodiments of the disclosure better correlate real-time battery energy available and predicted energy consumption remaining in the trip so that the DTE prediction will be more accurate throughout the trip. However, if the battery drop along a segment is faster/slower than predicted, then there will be errors in the DTE result as previously described. One or more embodiments adjust the displayed DTE in response to the error exceeding a corresponding threshold, such as a DTE change of 25 miles, for example. Because battery energy available and the current distance traveled by the vehicle are always known, the DTE can be updated onboard the electrified vehicle using the previously described strategy at high frequency throughout the route.

As illustrated in FIG. 4, the DTE for trip 400 was not only correct at the beginning point 410 and trip destination 450 with 300 miles driven and 100 kWh consumed for an average efficiency of 0.333 kWh/mi, but throughout the entire trip 400. As such, the segment-based DTE according to embodiments of the disclosure provided an accurate interim or dynamic DTE with a 1:1 correlation between miles driven and reduction of DTE miles.

While suitable for some applications, informing the customer of available charging stations reachable with a current battery energy, or displaying a DTE that may be accurate only at the beginning and end of a trip may lead to unnecessary range anxiety because the customer has no confidence in the interim DTE along a route. Embodiments according to the disclosure provide a dynamic adjustment to DTE based on predicted energy consumption for individual segments along the route to provide a more reliable indication of DTE that tracks actual distance traveled to improve customer confidence and reduce range anxiety with respect to reaching the intended destination.

While exemplary embodiments are described above, it is not intended that these embodiments describe all possible forms encompassed by the claims. The words used in the specification are words of description rather than limitation, and it is understood that various changes can be made without departing from scope of the disclosure and claimed subject matter. As previously described, the features of various embodiments can be combined to form further embodiments that may not be explicitly described or illustrated.

Although various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle, comprising:
a traction battery;
a human-machine interface (HMI);
a transceiver configured to wirelessly transmit a trip destination received via the HMI and to wirelessly receive trip data from an external computer server, the trip data including a segment energy efficiency and an associated segment distance for each of a plurality of road segments of an associated route to the trip destination, at least one of the plurality of road segments including a combination of at least two road links combined into the road segment based on maximizing a difference between energy consumption of the road segment relative to an immediately subsequent road segment; and
a controller in communication with the traction battery, the transceiver, and the HMI, the controller configured to communicate a distance-to-empty (DTE) for display by the HMI, the DTE based on the received segment energy efficiency and associated segment distance of each remaining segment in the trip, wherein maximizing the difference between energy consumption of each road segment relative to an immediately subsequent road segment comprises maximizing standard deviation of a weighted energy segment corresponding to a segment length multiplied by a difference between estimated energy required for the segment and an average segment estimated energy requirement.

2. The electrified vehicle of claim 1, the controller further configured to calculate the DTE based on a remaining trip distance, available energy of the traction battery, an estimated traction battery energy required for the remaining trip distance, and an overall vehicle efficiency, the estimated traction battery energy being based on a combination of the received segment energy efficiency and associated segment distance of each remaining segment in the trip.

3. The electrified vehicle of claim 2, the transceiver further configured to wirelessly transmit the trip destination in response to input via the HMI, and to wirelessly receive all the trip data for the associated route prior to the controller communicating the DTE for display.

4. The electrified vehicle of claim 3, the HMI configured to display a single DTE.

5. The electrified vehicle of claim 1, the controller further configured to recalculate the DTE based on segment energy efficiency and associated segment distance for a plurality of segments received in response to a route change from a previously associated route for the trip destination.

6. The electrified vehicle of claim 1 wherein each of the at least two road links includes energy consumption estimates for the traction battery associated with: propelling the electrified vehicle, climate control of the electrified vehicle, use of accessories in the electrified vehicle, and losses of the electrified vehicle.

7. An electrified vehicle, comprising:
a traction battery;
an electric machine coupled to the traction battery and configured to propel the vehicle;
a climate control system;
at least one vehicle accessory powered by the traction battery; and
a controller in communication with the traction battery and the electric machine, the controller configured to communicate a distance-to-empty (DTE) to a display of the electrified vehicle, the DTE based on trip data received from an external computing device, the trip data including a plurality of road segments associated with a selected route to a trip destination, each of the plurality of road segments including an associated segment distance and estimated energy consumption by the traction battery for: propelling the vehicle through the segment using the electric machine, operating the climate control system while traveling through the segment, and powering the at least one vehicle accessory while traveling through the segment, wherein the DTE is based on a remaining trip distance, available energy of the traction battery, an estimated traction battery energy required for the remaining trip distance based on the received trip data, and a vehicle efficiency, wherein each of the plurality of road segments comprises a combination of at least two road links that are combined to maximize a difference between energy consumption of each road segment relative to adjacent road segments associated with the selected route, and wherein maximizing the difference between energy consumption of each road segment relative to adjacent road segments comprises maximizing standard deviation of a weighted energy segment corresponding to a segment length multiplied by a difference between estimated energy required for the segment and an average segment estimated energy requirement.

8. The electrified vehicle of claim 7 further comprising a human-machine interface (HMI) including the display, the HMI configured to receive input designating the trip destination and input designating the selected route to the trip destination.

9. The electrified vehicle of claim 8 further comprising a transceiver configured to wirelessly transmit the trip destination to the external computing device and to wirelessly receive the trip data from the external computing device.

10. A method for an electrified vehicle having an electric machine coupled to a traction battery to selectively propel the vehicle, the method comprising, by the electrified vehicle:
receiving trip data via a transceiver of the electrified vehicle from an external server, the trip data including a plurality of road segments of a selected route from a starting location to a destination, each road segment having an associated energy consumption estimate and distance, wherein each of the plurality of road segments comprises a combination of at least two road links combined to maximize a difference between energy consumption of each road segment relative to adjacent road segments associated with the selected route, and wherein maximizing the difference between energy consumption of each road segment relative to adjacent road segments comprises maximizing standard deviation of a weighted energy segment corresponding to a segment length multiplied by a difference between estimated energy required for the segment and an average segment estimated energy requirement;

calculating a distance-to-empty (DTE) by one or more vehicle controllers of the electrified vehicle based on a remaining trip distance to the destination, available energy of the traction battery, an estimated traction battery energy required for the remaining trip distance, and an overall vehicle efficiency, the estimated traction battery energy being based on a combination of the received segment energy consumption and distance of each remaining segment in the trip; and communicating the DTE to a display within the electrified vehicle.

11. The method of claim 10 wherein each energy consumption estimate for each of the plurality of road segments includes energy consumption estimates for the traction battery associated with propelling the electrified vehicle through the segment, climate control of the electrified vehicle while traveling through the segment, and use of accessories in the electrified vehicle during travel through the segment.

12. The method of claim 10 further comprising transmitting the destination to the external server in response to selection of the destination via a human-machine interface of the electrified vehicle.

13. The method of claim 10 wherein at least two of the plurality of segments have different distances and different associated energy consumption.

14. The method of claim 13 wherein the at least two segments have different energy consumption rates or efficiencies per unit distance.

15. The method of claim 10 further wherein the DTE is calculated in response to a change in the selected route to the destination.

* * * * *